(12) United States Patent
Field (10) Patent No.: US 8,009,308 B2
(45) Date of Patent: Aug. 30, 2011

(54) SYSTEM AND METHOD FOR HANDLING PRINTING PRESS WORKLOAD

(75) Inventor: Andrew S. Field, Emigrant, MT (US)

(73) Assignee: Printingforless.com, Livingston, MT (US)

( * ) Notice: Subject to any disclaimer, the term of this patent is extended or adjusted under 35 U.S.C. 154(b) by 930 days.

(21) Appl. No.: 11/179,101

(22) Filed: Jul. 12, 2005

(65) Prior Publication Data

US 2007/0013940 A1  Jan. 18, 2007

(51) Int. Cl.
G06F 3/12 (2006.01)

(52) U.S. Cl. ...... 358/1.15; 358/1.1; 358/1.13; 358/1.14; 358/1.16; 358/1.18; 358/1.9; 358/1.12

(58) Field of Classification Search .................. None
See application file for complete search history.

(56) References Cited

U.S. PATENT DOCUMENTS

| | | | |
|---|---|---|---|
| 4,839,829 A | 6/1989 | Freedman | |
| 4,908,301 A | 3/1990 | Grosso et al. | |
| 5,241,464 A | 8/1993 | Greulich et al. | |
| 5,287,194 A | 2/1994 | Lobiondo | |
| 5,813,348 A * | 9/1998 | Zingher | 101/494 |
| 5,826,244 A | 10/1998 | Huberman | |
| 5,995,723 A | 11/1999 | Sperry et al. | |
| 6,012,070 A * | 1/2000 | Cheng et al. | 715/234 |
| 6,076,080 A * | 6/2000 | Morscheck et al. | 705/400 |
| 6,134,568 A | 10/2000 | Tonkin | |
| 6,247,011 B1 | 6/2001 | Jecha et al. | |
| 6,324,521 B1 | 11/2001 | Shiota et al. | |
| 6,330,542 B1 | 12/2001 | Sevcik et al. | |
| 6,333,790 B1 | 12/2001 | Kageyama | |
| 6,337,712 B1 * | 1/2002 | Shiota et al. | 348/231.1 |
| 6,441,920 B1 * | 8/2002 | Smith | 358/1.2 |
| 6,504,620 B1 | 1/2003 | Kinjo | |
| 6,535,294 B1 | 3/2003 | Arledge et al. | |
| 6,631,375 B2 | 10/2003 | Jecha et al. | |
| 6,950,198 B1 | 9/2005 | Berarducci et al. | |
| 7,042,585 B1 | 5/2006 | Whitmarsh et al. | |
| 7,081,969 B1 * | 7/2006 | Motamed et al. | 358/1.16 |
| 7,120,634 B2 | 10/2006 | Jecha et al. | |
| 7,126,708 B1 | 10/2006 | McConn et al. | |
| 7,239,408 B1 * | 7/2007 | Whitmarsh et al. | 358/1.15 |
| 7,242,490 B1 * | 7/2007 | Palmer et al. | 358/1.15 |
| 2002/0019786 A1 * | 2/2002 | Gonzalez et al. | 705/28 |
| 2002/0024686 A1 * | 2/2002 | Uchiyama et al. | 358/407 |
| 2002/0026379 A1 * | 2/2002 | Chiarabini et al. | 705/26 |
| 2002/0063887 A1 * | 5/2002 | White | 358/1.15 |
| 2002/0077878 A1 * | 6/2002 | Castellani et al. | 705/9 |
| 2002/0196452 A1 * | 12/2002 | Komiya | 358/1.1 |
| 2003/0107760 A1 | 6/2003 | King et al. | |

(Continued)

OTHER PUBLICATIONS

UPS: Thurmond, Jeffery; "Shipping Into the Next Century," The National Public Accountant, Jun. 1996, v41n6p. 13, 2pgs, Proquest #9667408.

(Continued)

*Primary Examiner* — Mark K Zimmerman
*Assistant Examiner* — Pawandeep S Dhingra
(74) *Attorney, Agent, or Firm* — Dorsey & Whitney LLP (57) ABSTRACT

A system and method is provided for ganging print orders to be printed on a press based on a set of print attributes, wherein associated digital files of the print orders are ganged together in one file location to generate a gang ticket in a database for the ganged print order, and displaying the gang ticket.

20 Claims, 7 Drawing Sheets

U.S. PATENT DOCUMENTS

2003/0218770 A1* 11/2003 Field .......................... 358/1.15
2004/0008369 A1* 1/2004 Keane et al. ............... 358/1.15
2004/0008370 A1* 1/2004 Keane et al. ............... 358/1.15
2004/0130741 A1* 7/2004 Ferlitsch .................... 358/1.13
2005/0108036 A1* 5/2005 Andreoli et al. ................ 705/1
2005/0195419 A1* 9/2005 Bart ........................... 358/1.13
2006/0152776 A1* 7/2006 Bailey ......................... 358/504

OTHER PUBLICATIONS

UPS: www.ups.com; Internet Archive Wayback Machine, www.archive.org/web/19970605xxxxxx/http://www.ups.com/; 1997, 14 pages.

Edwards et al., "Roll Over Gutenberg: How the Web is Changing Printing," Seybold Report on Internet Publishing, Sep. 1997, v2n1p. 5(16), Dialog file 275 #02110082.

Eliezer, "Robert's web: Printer Cust Turnaround Time With Web (A&a Printers and Digital Graphics Offers Printing Services Via the Company's Web Page)," Seybold Report on Desktop Publishing, Dec. 11, 1995, v10n4p. 20(6), Dialog 275 #01893823.

Printing Impressions, "Section 3: Prepress Electronic Imaging", Jul. 1998, v41n2p. 148(1), Dialog file 16 #06057253.

OIC: Pack, "Interactive Web Sites Help Calculate Your Life," Austin American Statesman, Feb. 10, 1996, Proquest.

OIC: Spittles, "The Best Site for Your New House is . . . www.co.uk Homebuyers Are Online to Hassle-free Purchasing As Lenders Wake Up to the Internet," The Observer, Dec. 21,1997, p. 11, ISSN #00297712, Proquest.

OIC: Morton, "The Competitive Arsenal in the Small Shipment Wars, "Transportation & Distribution, Mar. 1996, v37n3p. 65, ISSN #08958548, Proquest.

OIC: Weber, "Watching the Web," Wall Street Journal, Jan. 22, 1998, p. B5, ISSN #00999660, Proquest.

Real-time: Wilson, Doug' "Going Gateway One Better," Reseller Management, Feb. 1998, v21n2p. 64, Proquest.

Real-time: Way, Paul; "Progressive Sells, Binds Auto Insurance on 'Net," Insurance and Technology, Oct. 1997, v22n10pg Proquest #22387774, 3pgs.

Veeramani et al.; "Methodologies for Rapid and Effective Response to Request for Quotation (RFQs)," IIE Transactions, Oct. 1997, v29n10p. 825, Proquest #23351982, 16 pgs.

Real-time: InforSpace Launches Fee, real-Time Quotes and Other Investment Services to Consumers, PR Newswire, Feb. 17, 1998, Proquest #26408924.

\* cited by examiner

Production Dashboard

| Status | PFL-Net Review | ECP Review | Gang Waiting | Assigned to Gang | Assigned to DI | Assigned to 5C | Assigned to 2C | Assigned to 1C | Plat |
|---|---|---|---|---|---|---|---|---|---|
| # of Orders | 1 | 5 (4.4) | 108 (32.1) | | 2 | 1 | | | |
| Total | $500 | $2,700 | $17,700 | | $400 | $900 | | | |
| Avg # of Orders | | | | | | | | | |
| Avg Total | | | | | | | | | |

| Must Print By | Sun 6/26 | Mon 6/27 | Today | Wed 6/29 | Thu 6/30 | Fri 7/1 | Sat 7/2 |
|---|---|---|---|---|---|---|---|
| DI 39.3 | 1/1.9/0 | 7/8.4/0 | 10/14.3/18/24.6 | 5/6.6/23/6.6 | 0/1.5/21/9.8 | 0/0.0/19/12.6 | 2/13.5/12/9.8 |
| 5C 35.5 | 3/3.4/0 | 17/15.2/0 | 17/14.3/18/33.7 | 5/9.0/22/9.0 | 0/0.0/20/3.1 | 0/0.0/18/4.7 | 0/5.0/11/12.9 |
| 2C | | 1/1.1/0 | 3/5.8/5/9.6 | 5/4.9/5/4.9 | 3/5.4/5/6.3 | 0/0.0/5/1.4 | 0/0.0/5/2.3 |
| 1C | | 4/4.8/0 | 1/1.0/8/10.6 | 0/0.0/8/0.0 | 0/0.0/8/0.5 | 0/2.0/8/2.8 | 0/0.0/8/1.3 |
| Gang | | 1 | 39 | 61 | | | 3 |
| Non-Gang | | 3 | 1 | | | | |

| Press Production | Tue 6/21 | Wed 6/22 | Thu 6/23 | Fri 6/24 | Sat 6/25 | Sun 6/26 |
|---|---|---|---|---|---|---|
| DI | 15/15.4/$3,300 | 13/19.6/$4,100 | 14/15.8/$2,900 | 14/17.4/$3,700 | 16/28.9/$3,700 | 19/18.8/$3,800 |
| 5C | 20/21.7/$6,300 | 15/16.5/$8,400 | 20/16.2/$6,100 | 17/14.2/$5,400 | 16/18.3/$6,700 | 24/18.9/$9,000 |
| 2C | 5/7.3/$1,200 | 4/5.0/$800 | 3/2.8/$700 | 8/8.5/$1,300 | | |
| 1C | 6/4.9/$900 | 2/4.7/$300 | 2/1.4/$400 | 8/5.9/$1,100 | | 10/8.7/$1,200 |

Must Print By: Number of Press Runs / Estimated Press Time / Press Load Goal / Adjusted Press Load
Press Production: Number of Press Runs / Actual Press Time / Partner Amount

Gang Assignment

Show All    Press: [ ▼ ]    Target Sheet Quantity: [ ▼ ] [ ]    0 slots taken    0 spoilage    [ Clear All ]

108 Jobs Found

| Assign To Gang | Type of Stock | Product Type | Must Print By | Ink | Coating | Must Ship By | Comments | Ship Type | Increments | Total Quantity | Order Number |
|---|---|---|---|---|---|---|---|---|---|---|---|
| ☐ | 100# Uncoated Cover | Business Cards | 6/27/2005 | 4-Color/None | No Coating | 6/29/2005 | | 2 Day Air | 1 x 500 | 500 | 114859086 |
| ☐ | 100# Uncoated Cover | Business Cards | 6/28/2005 | 4-Color/4-Color | No Coating | 6/30/2005 | | UPS Ground | 1 x 500 | 500 | 114541093 |
| ☐ | 100# Uncoated Cover | Custom Quote | 6/28/2005 | 4-Color/4-Color | No Coating | 6/30/2005 | 2 x 3.5 Business Cards. Cards do not match reprint, first printing ink coverage was to high, and cards within order did not match each other and add inapproriate use of rich black | UPS Ground | 2 x 500 | 1000 | 114340084 |
| ☐ | 100# Uncoated Cover | Business Cards | 6/28/2005 | 4-Color/None | No Coating | 6/30/2005 | | UPS Ground | 1 x 500 | 500 | 114261076 |
| ☐ | 100# Uncoated Cover | Business Cards | 6/28/2005 | 4-Color/None | No Coating | 6/30/2005 | | UPS Ground | 1 x 500 | 500 | 114263050 |
| ☐ | 100# Uncoated Cover | Business Cards | 6/28/2005 | 4-Color/None | No Coating | 6/30/2005 | | UPS Ground | 1 x 500 | 500 | 114469021 |
| ☐ | 100# Uncoated Cover | Business Cards | 6/28/2005 | 4-Color/None | No Coating | 6/30/2005 | | UPS Ground | 1 x 500<br>1 x 500<br>1 x 500 | 1500 | 114535053 |
| ☐ | 100# Uncoated Cover | Business Cards | 6/28/2005 | 4-Color/None | No Coating | 6/30/2005 | | UPS Ground | 1 x 500 | 500 | 110043070 |

Choose Gang: [ New ▼ ]

[ Assign To Gang ]

| Gang# 7934 | | Press: 5C | Total: $2,027.45 | | | Must Ship By: 6/29/2005 | | | Gang Files |
|---|---|---|---|---|---|---|---|---|---|
| Status: 40 - Plates Made | | | | | | | | | |
| Thumbnail | Order Number / Customer | | Description | Total Price | Ship Type | Must Ship By | Quantity | Increments | Colors/Side |
| | 112140024 | | Business Cards | $143.45 | UPS Ground | 6/29/2005 | 1500 | 2 x 500<br>1 x 500 | 4-Color/None<br>No Coating |
| | Danuu - Danusia Niklewicz | | | | | | | | |
| | 112652999 | | Business Cards | $0.00 | Next Day Air | 6/29/2005 | 1000 | 1 x 500<br>1 x 500 | 4-Color/None<br>No Coating |
| | Rework Reason:<br>• Customer - Expectations Not Met<br>• Too tight<br>Terri Nespole - Terri Nespole | | | | | | | | |
| | 113449077 | | Business Cards | $139.95 | Next Day Air | 6/29/2005 | 1000 | 1 x 500<br>1 x 500 | 4-Color/None<br>No Coating |
| | Croll Reynolds Company, Inc. - Samuel Croll | | | | | | | | |
| | 114024034 | | Business Cards | $145.45 | UPS Ground | 6/29/2005 | 1500 | 1 x 500<br>1 x 500<br>1 x 500 | 4-Color/None<br>No Coating |
| | Advanced Performance Consulting Group - Israel Pinto | | | | | | | | |
| | 114069072 | | Note Cards<br>Score Only | $343.50 | UPS Ground | 6/30/2005 | 1000 | 1 x 1000 | 4-Color/None<br>No Coating |
| | Emerge Inc. - Nyree Proctor | | | | | | | | |
| | 114178059 | | Business Cards | $395.95 | UPS Ground | 6/29/2005 | 5000 | 10 x 500 | 4-Color/None<br>No Coating |
| | Jenny Sweeney Designs, Inc - Jenny Sweeney | | | | | | | | |
| | 114180079 | | Business Cards | $358.45 | UPS Ground | 6/29/2005 | 4500 | 3 x 500<br>3 x 500<br>3 x 500 | 4-Color/None<br>No Coating |
| | Jenny Sweeney Designs, Inc - Jenny Sweeney | | | | | | | | |

SYSTEM AND METHOD FOR HANDLING PRINTING PRESS WORKLOAD

FIELD OF THE INVENTION

The present invention relates generally to a system and method for dynamically determining and handling printing press workload, and more particularly, to a system and method for distributing print order workload to internal presses or external partners' presses based on the current calculated press workload, and efficiently combining multiple press-ready orders based on the orders' print specifications/attributes.

BACKGROUND OF THE INVENTION

In the commercial printing industry, customers design and order many diverse formats, sizes and quantities of documents for printing to suit their advertising or other needs. These include everything from smaller-sized business cards, post-cards and mail inserts, to multiple-page catalogs and larger-sized products such as posters. The printer often must convert customers' submitted digital files into press-ready files that can print on any commercial printing press. Accordingly, it is desirable for a printer to combine multiple press-ready files for smaller-sized documents of different formats onto one larger-sized press sheet, in order to minimize paper waste and increase press efficiency to maximize profitability.

Also, customers request various production speeds for their products, or "turnaround" time, usually anywhere between 2 days to 2 weeks. The printer, therefore, needs to be able to schedule or distribute printing to its presses and combine orders onto press sheets in such a way that each of those individual customer orders' turnaround time is met, while utilizing press resources as efficiently as possible.

Once the orders are combined, the press operators need to be able to track the group of combined orders, called a "gang," through their workflow. When using a database workflow system, it is beneficial for the operator to be able to view and track the gang as a single press job while having the ability to view the specific details of the individual orders.

SUMMARY OF THE INVENTION

The present invention provides a system and method of dynamically handling press workload, including determining current press workload, distributing new print orders and their associated digital files to internal presses and/or external partner's presses based on the current press workload, and efficiently combining multiple press-ready orders based on the orders' print specifications/attributes.

In one embodiment of the present invention, the method includes: dynamically determining current press workload; and distributing new print orders and their associated digital press-ready files to an internal press or external partner based on the current workload and based on a set of print attributes, such as the turnaround time for each of the print orders, in order to maximize press resources.

Still in one embodiment of the present invention, the method includes: determining which print orders can be printed or "ganged" together on the same press sheet based on a set of print order attributes; and collecting the press-ready files corresponding to the print orders together in one file location for combining onto a single press sheet.

Further in one embodiment of the present invention, the set of print order attributes for the ganged orders include but are not limited to: total and component quantities to be printed for each order, the product dimensions, the type of paper to be used, whether both front and back will be printed and the number of color inks to use on each side, whether coating will be applied, and required print completion date.

One of the advantages of the present invention is that the dynamic press workload and print order distribution system allows for efficient scheduling and distribution of print orders, which results in the ability to meet the customers' requested turnaround time for the orders and allows for efficient use of commercial printing press capacity and resources.

Another advantage of the present invention is that the print order ganging system allows operators to easily assign multiple press orders together to be combined on a single gang, in such a way to minimize paper waste and increase efficiency to maximize profitability.

A further advantage of the present invention of the print order ganging system is that it collects the files together in one location for combining onto a press sheet, and combines the orders together in a print order database on one unified work order, called a "gang ticket" which lists all the ganged orders for handling through the press workflow, while allowing operators to view specific details of each individual order on the gang.

These and other features and advantages of the present invention will become apparent to those skilled in the art from the following detailed description, wherein it is shown and described through illustrative embodiments of the invention, including best modes contemplated for carrying out the invention. As it will be realized, the invention is capable of modifications in various obvious aspects, all without departing from the spirit and scope of the present invention. Accordingly, the drawings and detailed descriptions that follow are to be regarded as illustrative in nature and not restrictive.

DETAILED DESCRIPTION OF THE PREFERRED EMBODIMENTS

The present invention provides a system and method of handling printing press workload, from the distribution of the print orders to certain presses based on dynamically determining the current press workload, through the efficient combining of multiple orders together based on a set of print specification/attributes.

Figure 1:
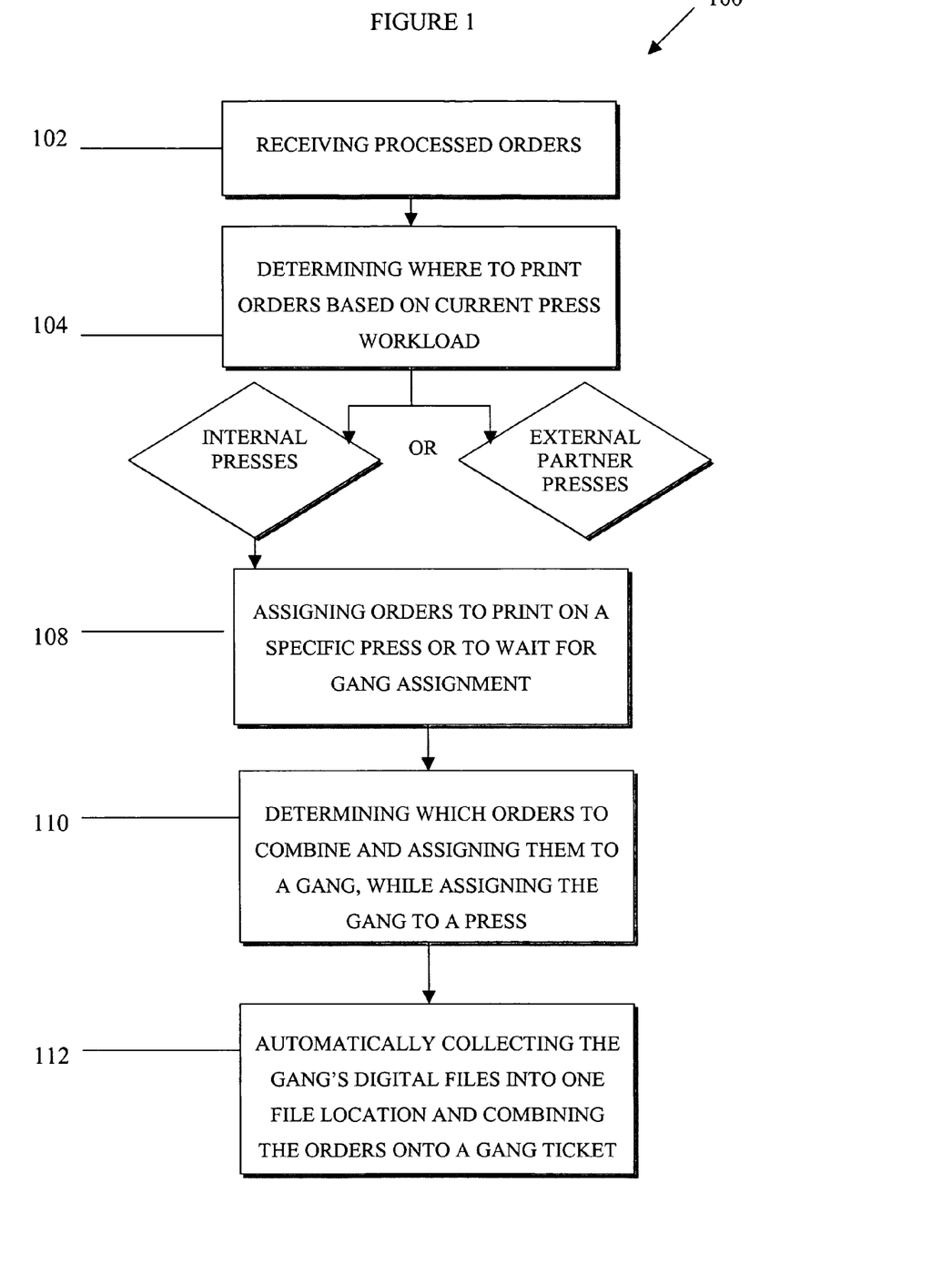
FIG. 1 illustrates a flowchart of an exemplary process of handling printing press workload, in accordance with the principles of the present invention.

FIG. 1 illustrates one exemplary process 100 of handling press workload. The process 100 starts with an operation 102 of receiving a plurality of print orders that have been processed and are ready to be printed on press. In an operation 104, the process 100 allows an automated system and/or a coordinating reviewer to determine whether to print each order on an internal press or at an external partner's press based on, for example, the current internal press workload.

In an operation 108 shown in FIG. 1, orders distributed to internal presses are either assigned to a specific press, or set to wait for assignment to a gang to be combined with other print orders on a press sheet for a particular press. Once a group of orders are assigned to a gang, in an operation 112, the process 100 automatically collects the digital files from multiple individual file locations and deposits them to a single gang file location. With the files together in one location, an operator can more easily combine the files onto a single press sheet file. In addition, operation 112 also automatically combines the information for the individual orders onto a single gang ticket for efficient tracking of the combined orders through a press database workflow.

It is appreciated that the above process 100 may be varied depending on the customer needs within the scope or spirit of the present invention.

Figure 2:
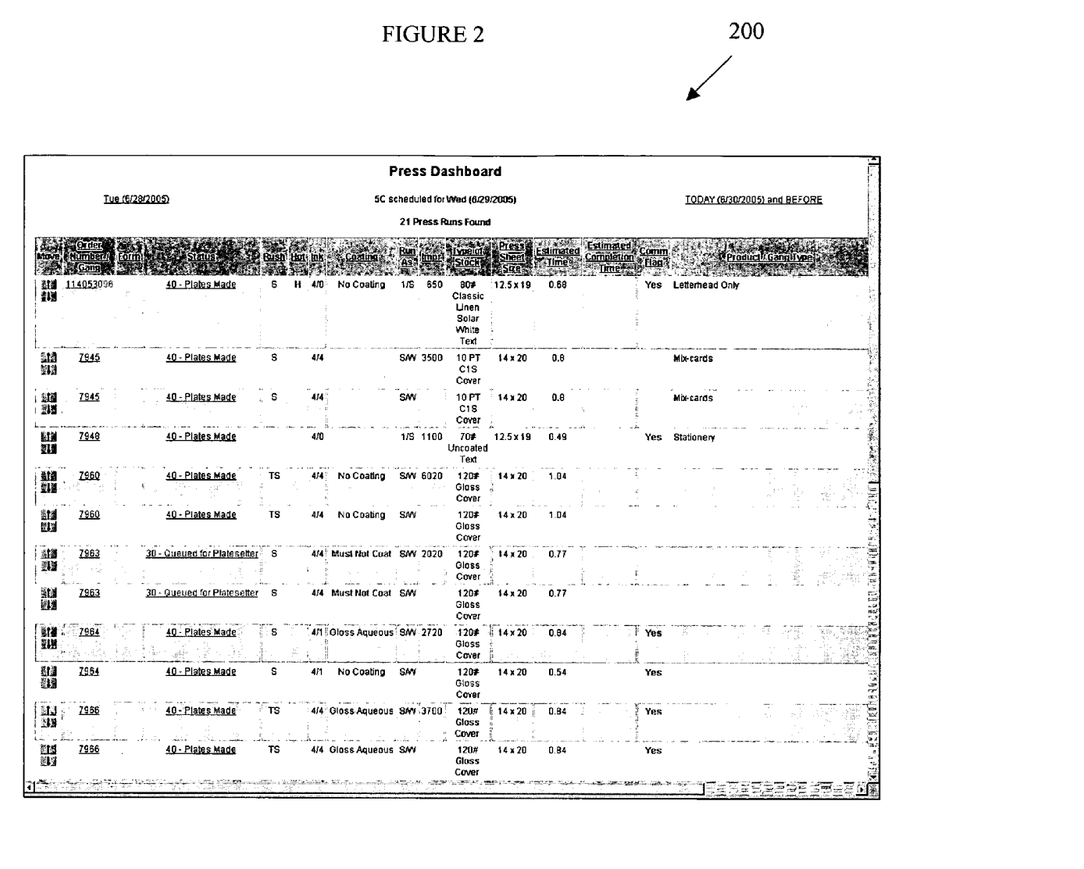
FIG. 2 illustrates a screen display of a press workload dashboard with estimated times calculated for each press run, in accordance with the principles of the present invention.

In FIG. 2, a screen display of a component of a press workload schedule dashboard or monitor of one embodiment of a press workload handling system 200 is shown. On the press workload dashboard, it is shown that twenty-one (21) press runs are scheduled to be printed on the 5-color press (abbreviated as 5C) on Jun. 29, 2005. A press run generally refers to a set of ink and/or coating impressions made on one side of paper that's run through the press.

Columns of the dashboard shown in FIG. 2 show items such as: up and down "Move" buttons for moving a print run earlier or later in the sequence; "Order Number/Gang" showing an order number or a gang number which contains a group of print orders; and several print attributes for the order or gang, such as inks, coating and paper to be used. Since one print order or gang of orders may involve multiple press runs (if there will be printing on two sides, for instance), there may be more than one press run for an order or gang on the dashboard.

Another column in FIG. 2 titled "Estimated Time" shows the calculated time in hours for the press to complete a print run, which is based on the number of Impressions (abbreviated as Impr) to be print and other print attributes for the order or gang of orders.

As shown in FIG. 2, by displaying the print orders and gangs, print status, and the characteristics of the print orders for a given press, and also allowing the print orders to be moved in the scheduled sequence, the press workload schedule can be dynamically changed and monitored. By estimating the time for each print run, the press workload handling system can dynamically display the number of hours of printing scheduled per day per press, as evidenced in the next drawing.

It is appreciated that the press workload schedule dashboard in FIG. 2 may also display other suitable items to be monitored without departing from the scope of the present invention.

Figure 3A:
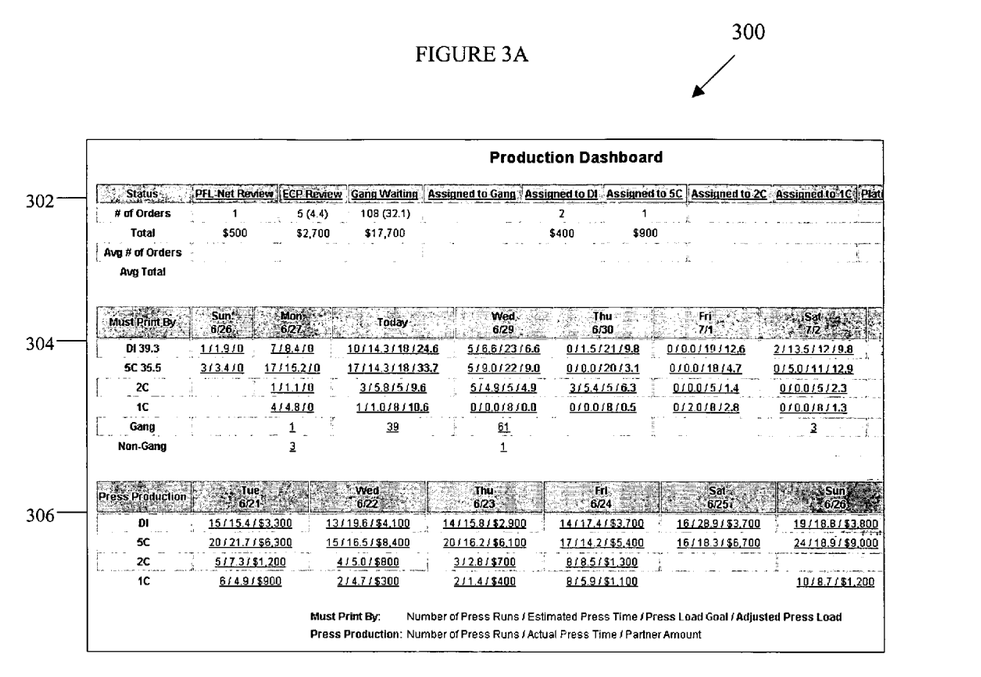
FIG. 3A illustrates a screen display of a press workload production schedule summary for all internal presses, showing the number of press runs and estimated press time by print date for each press, in accordance with the principles of the present invention.

In FIG. 3A, a screen display of a print press operation production dashboard or monitor of one embodiment of a press workload handling system 300 is shown. A top display 302 shows items such as the number of orders, total value of the orders, the average number of orders, and the average value of the orders that are under review by a print order coordinator for external partners, under review by an internal production coordinator, under a to-be-assigned gang waiting list, under an assigned gang number, or assigned under different printing presses (e.g. DI, 5C, 1C, etc.).

A middle display 304 in FIG. 3A shows the "Must Print By" week schedules (e.g. from Sunday Jun. 26 to Sat Jul. 2) for different presses, noted by abbreviations (e.g. DI, 5C, 2C and 1C). The series of numbers shown for each Must Print By day for each press represent the estimated calculated press workload for the orders scheduled to print that day. A key for the series is given at the bottom of FIG. 3A: each series of numbers shows the Number of Press Runs/Estimated Press Time/Press Load Goal/Adjusted Press Load.

A bottom display 306 in FIG. 3A shows actual weekly production (e.g. from Tues. Jun. 21 to Sun. Jun. 26) of different presses, e.g. DI, 5C, and 1C, including actual calculated press time.

Figure 3B:
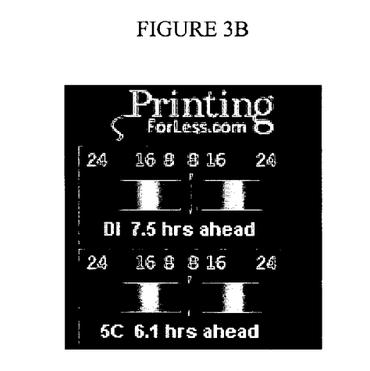
FIG. 3B illustrates a screen display of a press workload production schedule summary showing the current workload of two main presses in number of hours each press is ahead or behind schedule, including a dynamic color-coded line graph, in accordance with the principles of the present invention.

FIG. 3B shows a screen display of color-coded line graphs indicating the calculated printing press workload for two internal presses, the DI and 5C presses. The graphs show the number of hours each press is ahead or behind schedule. As shown in FIG. 3B, the DI press was 7.5 hours ahead of schedule and the 5C press was 6.1 hours ahead. In both cases the bar on the graph shows the presses to be in the green zone (the color is not shown) of the graph, indicating they are on schedule or less than 8 hours ahead or behind. The hours are calculated based on the estimated press workload hours calculated and shown in the display 304 of FIG. 3A.

An advantage of the system 300 of the present invention is that it allows print order production coordinators to quickly determine whether to distribute print orders to internal presses or external partner presses based on the current workload of the internal presses, so that no press is overloaded or lacking enough work to fill its capacity, and orders can meet the customer's requested timelines.

It is appreciated that the production dashboard components in FIGS. 3A and 3B may also display other suitable items to be monitored or vary in color or scale without departing from the scope of the present invention.

Figure 4:
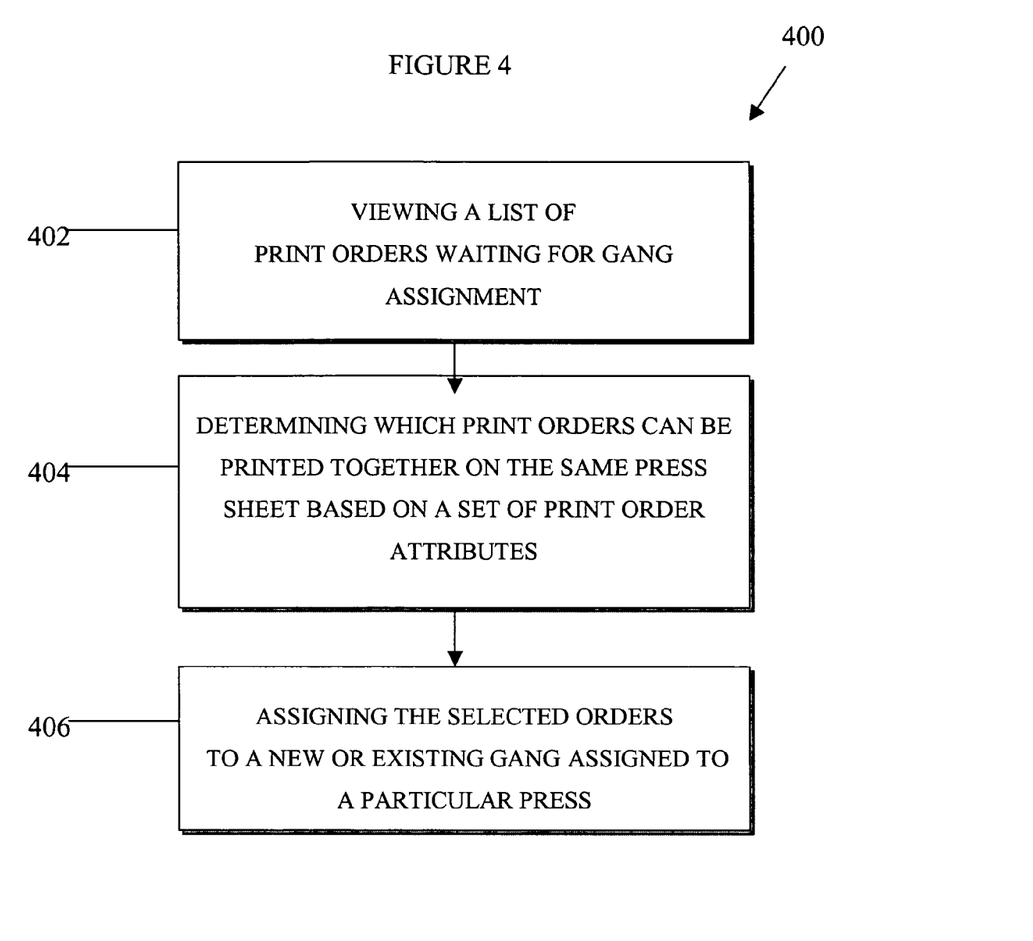
FIG. 4 illustrates a flow chart of one exemplary process of assigning multiple print orders to be printed together on a single gang, and automatically collecting the files for those orders into one file location and combining the orders for the gang onto a single database gang "ticket" (or work order), in accordance with the principles of the present invention.

FIG. 4 illustrates one exemplary process 400 of handling press workload for a print order ganging system. The system allows an operator to combine a variety of different types of print orders onto gangs in accordance with the principles of the present invention. The process 400 starts with an operation 402 of viewing a list of a plurality of print orders that have been distributed for internal presses and are waiting for assignment to a gang, to be combined with other orders on a press sheet. In an operation 404, the process 400 allows an operator to determine and select which print orders can be printed together on the same press sheet based on a set of print order attributes. In an operation 406, the process 400 assigns the multiple orders to either a new or existing gang which is assigned to a particular press for printing.

Figure 5:
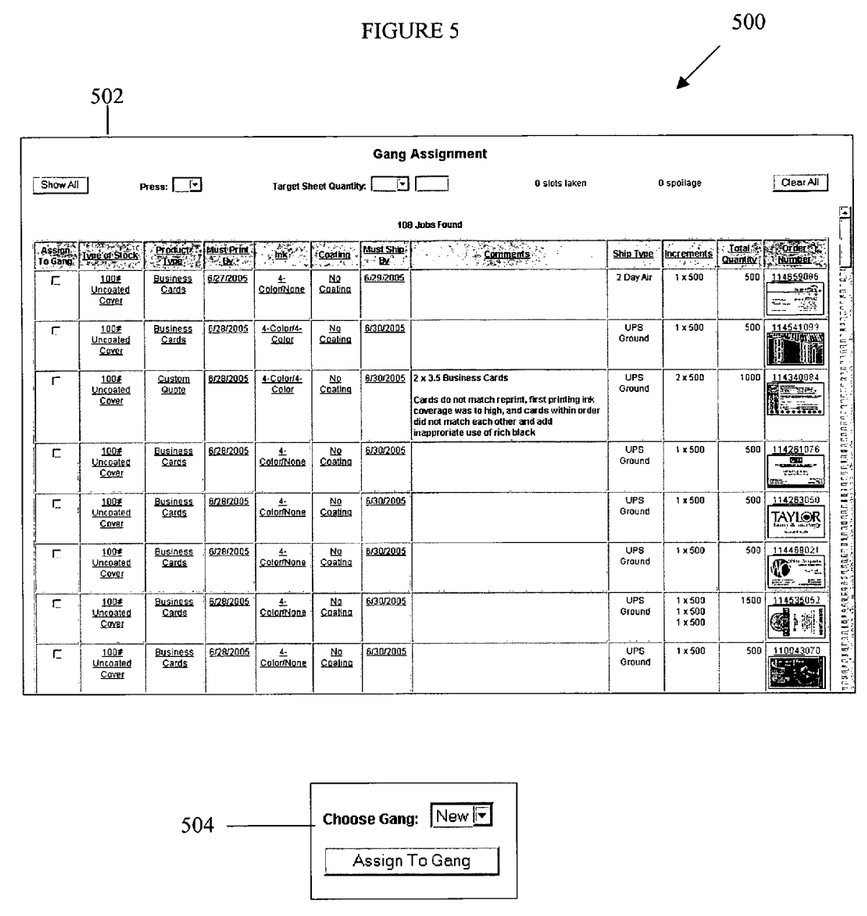
FIG. 5 illustrates screen displays for one exemplary process of selecting and assigning multiple print orders to a single gang in accordance with the principles of the present invention.

FIG. 5 illustrates one embodiment of a print order ganging system 500 of a press workload handling system, in accordance with the principles of the present invention. The print order ganging system 500 allows an operator to view a list of print orders and their print attributes in screen displays 502, 504. The print orders may include a wide variety of product types, quantity of pieces ordered, number of color inks and printed sides requested, and different shipping speeds requested. Specific comments entered for the individual orders are also displayed. The system 502 displays the date each order must print by and the date each order must ship by, which are automatically calculated based on the production speed (turnaround time) requested by the customer. The production speed equals the number of business days within which the order must be printed.

The print order ganging system 500, as shown in the screen display 502, allows an operator to check a box next to each print order that the operator determines should be assigned together to a gang, either assigned to a new gang or to an existing gang. The operator then assigns the new or existing gang to a particular press where the ganged print order files are printed by the listed Must Print By date. The display also includes thumbnail images of each of the ganged print order files to aid the operator in selecting files with similar ink densities and other qualities for optimal press efficiency.

As shown in the screen display 504, once the operator has selected the multiple files to be ganged together, the system 500 allows the operator to assign the ganged print orders to a new gang by choosing "New", or add orders to an existing gang by using the "Choose Gang" drop-down list/menu to choose an existing gang number.

An advantage of the print order ganging system 500 is that it allows an operator to sort by any of the column headings to more easily view orders with similar attributes. For example, if the operator is building a new gang or adding to an existing gang to be printed on 100# Uncoated Cover paper, the operator can simply click on the column heading 'Type of Stock' to sort by that attribute and view all the orders with that paper type together.

Another advantage of the present invention is that it allows a wide variety of file formats or different types of print orders to be ganged on the same press sheet and be printed on a commercial printing press to satisfy a wide variety of customers' needs.

The ganging technique also allows for efficient management of press workload, thereby resulting in quick turnaround time and efficient use of commercial printing press resources.

It is appreciated that the print order gang assignment screen displays in FIG. 5 may also include other suitable items to be monitored without departing from the scope of the present invention.

Once the operator clicks the button "Assign To Gang" as shown in the screen display 504, the system 500 automatically combines the press-ready digital files into one file location. This significantly saves the operator time and minimizes errors in later combining the files into a single press-ready file for a single press sheet.

Figure 6:
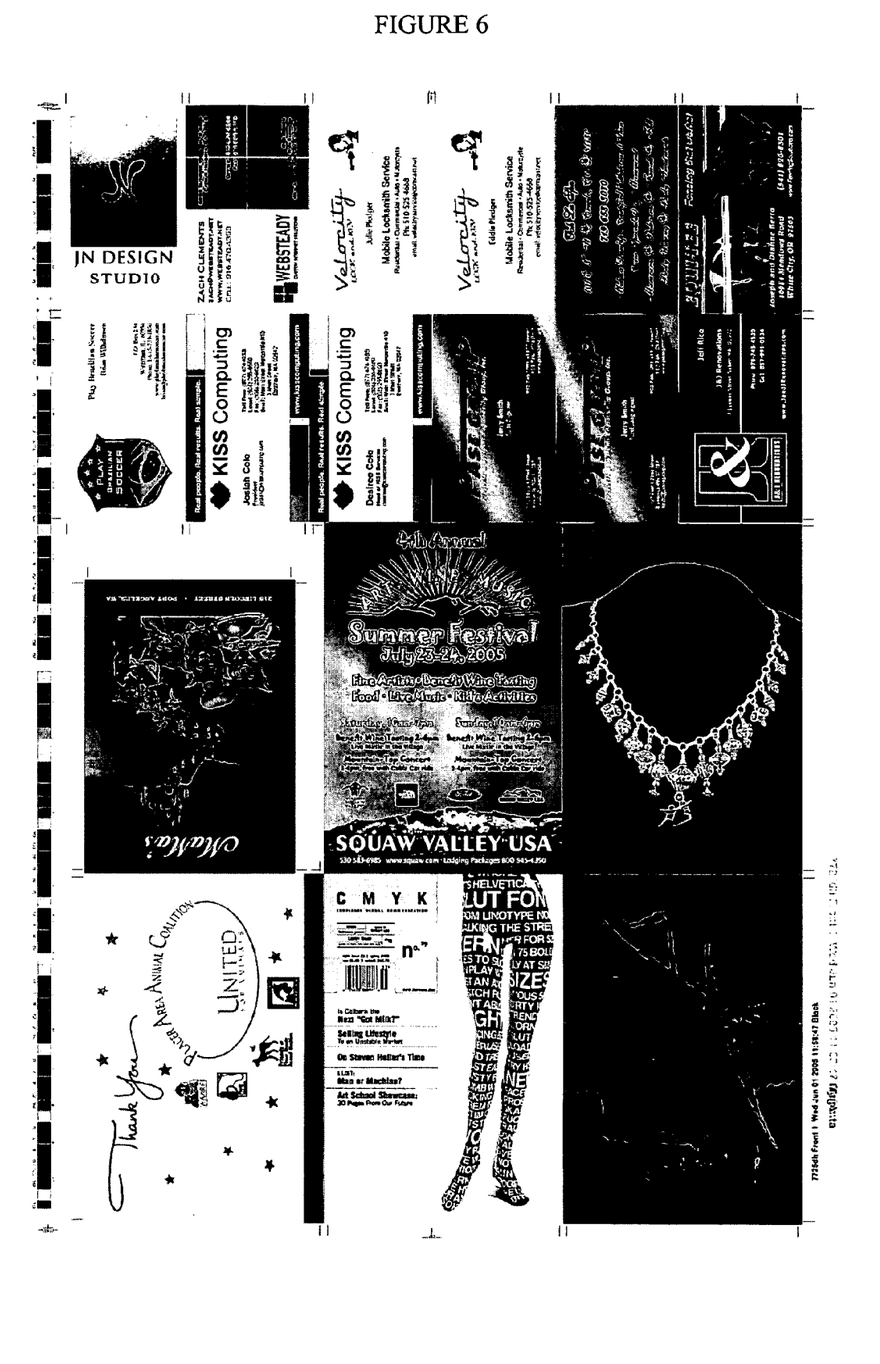
FIG. 6 illustrates a single digital press-ready file for a gang, the creation of which is simplified through the automatic collection of the individual files in one file location, in accordance with the principles of the present invention.

FIG. 6 shows an example of a single digital file which contains the files that are collected and deposited into one location for facilitating gang creation in the print order ganging system, in accordance with the present invention.

Figure 7:
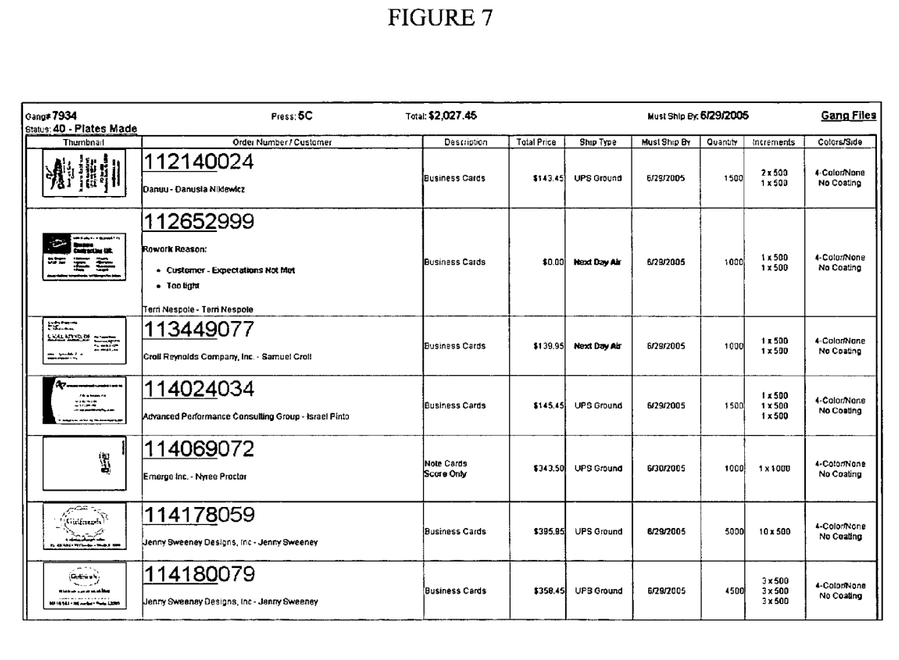
FIG. 7 illustrates a single gang "ticket" or work order for a press workflow database system that includes multiple types of print orders combined onto one press sheet, in accordance with the principles of the present invention.

In addition to collecting the digital files, the print order ganging system automatically combines information and images for each of the individual print orders in a database workflow for a gang ticket. FIG. 7 is a screen display of an exemplary gang ticket, which displays the order numbers, attributes and thumbnail images for each of the ganged print orders. An operator may click on an order number on the gang ticket to view more details and attributes about the individual order than are displayed on the gang ticket. At the top right of the display on FIG. 7 is a link for Gang Files which are previously collected together into one file location. An operator may click this link to view the press-ready files if needed for more detailed quality control check.

It is appreciated that the gang ticket illustrated in FIG. 7 may also display other suitable items to be monitored without departing from the scope of the present invention.

From the above description and drawings, it will be understood by those of ordinary skill in the art that the particular embodiments shown and described are for purposes of illustration only and are not intended to limit the scope of the present invention. Those of ordinary skill in the art will recognize that the present invention may be embodied in other specific forms without departing from its spirit or essential characteristics. References to details of particular embodiments are not intended to limit the scope of the invention.

What is claimed is:

1. A method of handling press workload, comprising:
   receiving a plurality of print orders, each having a set of print attributes and an associated digital file;
   determining whether each or some of the plurality of print orders will be printed by internal presses or external partner presses;
   ganging the print orders determined to be printed on internal presses using a print order ganging system dashboard, wherein the print orders are ganged and distributed to internal presses based on at least one of the press workload or the set of print attributes, wherein the internal press workload can be assessed and monitored through a press workload schedule dashboard;
   automatically collecting the digital files for the ganged print orders together in one file location, wherein print orders of different types can be ganged together; and
   generating a gang ticket in a database for the ganged print orders and displaying the gang ticket on a dashboard, wherein the ganged print orders and press workload are dynamically modifiable by a print operator associated with the internal presses including being able to add additional print orders to the gang and being able to remove print orders from the gang during ganging of the print orders and up until the ganged print order is running on press by using the print order ganging system dashboard.

2. The method of claim 1, wherein the gang ticket includes different file formats.

3. The method of claim 1, wherein the gang ticket includes different file characteristics.

4. The method of claim 1, wherein the set of print attributes include total quantity of the print orders, incremental quantities of component parts of the print orders, required turn around time, and/or estimated print completion time.

5. A method of handling press workload, comprising:
   receiving a print order which has a set of print attributes and an associated digital file, wherein the print orders may be printed by internal printing presses or external partners' printing presses;
   assigning the print order to a gang to be printed on a press based on at least one of the current press workload or the set of print attributes, wherein print orders determined to be printed on internal printing presses are assigned to a gang using a print order ganging system dashboard, and wherein current press workload can be assessed, and monitored through a press workload schedule dashboard;

automatically collecting the digital file of the print order together with corresponding digital files of the gang in one file location, wherein a gang can include print orders of different types; and generating a gang ticket in a database for the ganged print order and displaying the gang ticket on a dashboard, wherein the ganged print orders and the press workload are dynamically modifiable by a print operator associated with the internal printing presses including being able to add additional print orders to the gang and being able to remove print orders from the gang during ganging of the print orders and up until the ganged print orders are running on press by using the press workload schedule dashboard.

6. The method of claim 5, wherein the gang ticket includes different file formats.

7. The method of claim 5, wherein the gang ticket includes different file characteristics.

8. The method of claim 5, wherein the set of print attributes include total quantity of the print order, incremental quantities of component parts of the print order, required turn around time, and/or estimated print completion time.

9. A system for handling press workload, comprising:
a print order receiving module that receives a plurality of print orders, each having a set of print attributes and an associated digital file;
a print order ganging system dashboard for ganging the print orders based on at least one of the current press workload or the set of print attributes, wherein the current press workload can be assessed and monitored through a press workload schedule dashboard;
means for automatically collecting the digital files for the ganged print orders together in one file location, wherein print orders of different types can be ganged together; and
means for generating a gang ticket in a database for the ganged print orders, and displaying the gang ticket on a monitor, wherein the ganged print orders and the current press work load are dynamically modifiable by a print operator including being able to add additional print orders to the gang and being able to remove print orders from the gang during ganging of the print orders and up until the ganged print order is running on press by using the press workload schedule dashboard.

10. The system of claim 9, wherein the gang ticket includes different file formats.

11. The system of claim 9, wherein the gang ticket includes different file characteristics.

12. The system of claim 9, wherein the set of print attributes include total quantity of the print orders, incremental quantities of component parts of the print orders, required turn around time, and/or estimated print completion time.

13. A system for handling press workload, comprising:
a print order receiving module that receives a print order which has a set of print attributes and an associated digital file, wherein the print order may be printed by internal printing presses or external partners' printing presses;
a print order ganging system dashboard for ganging the print order to be printed on a internal printing presses based on at least one of the current press workload or the set of print attributes, wherein the current press workload can be accessed and monitored through a press workload schedule dashboard;
means for automatically collecting the digital file of the print order together with corresponding digital files of the gang in one file location, wherein a gang can include print orders of different types, generating a gang ticket in a database for the ganged print order, and displaying the gang ticket, on a monitor, wherein the gang ticket and the press workload are dynamically modifiable by a print operator associated with the internal printing presses including being able to add additional print orders to the gang and being able to remove print orders from the gang during ganging of the print orders and up until the ganged print order is running on press by using the press workload schedule dashboard.

14. The system of claim 13, wherein the gang ticket includes different product formats.

15. The system of claim 13, wherein the gang ticket includes different product characteristics.

16. The system of claim 13, wherein the set of print attributes include total quantity of the print order, incremental quantities of component parts of the print order, required turn around time, and/or estimated print completion time.

17. The method of claim 1, wherein the determining whether to perform the printing of print orders with internal presses or whether to distribute the print orders for printing on external partners' printing presses is based on the press workload of the internal presses at the time the print order is received or at the time the print order is scheduled for completion.

18. The method of claim 17, wherein the press workload of the internal presses can also be assessed and monitored by a real-time print press operation production dashboard.

19. The method of claim 18, wherein the print press operation production dashboard includes displaying total number of print orders, a total value of the orders, average number of orders and/or average value of the orders that are under review by at least one of an operator, and a coordinator for an external partner press, wherein each print order displayed on the print press operation production dashboard may be assigned to a gang waiting list, already assigned under a gang number, or assigned under different printing presses.

20. The method of claim 1, wherein the dashboard that displays the gang ticket includes at least the attributes for each of the ganged print orders, and either a thumbnail image of each of the ganged print orders, or a link to an image of each of the ganged print orders.

* * * * *